(12) United States Patent
Chen

(10) Patent No.: US 11,888,727 B2
(45) Date of Patent: Jan. 30, 2024

(54) EXTENDING BGP PROTECTION FOR SR PATH INGRESS PROTECTION

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

(*) Notice: Subject to any disclaimer, the term of this patent is extended or adjusted under 35 U.S.C. 154(b) by 261 days.

(21) Appl. No.: 17/380,673

(22) Filed: Jul. 20, 2021

(65) Prior Publication Data
US 2021/0352005 A1 Nov. 11, 2021

Related U.S. Application Data

(63) Continuation of application No. PCT/US2020/036117, filed on Jun. 4, 2020.

(60) Provisional application No. 62/857,684, filed on Jun. 5, 2019.

(51) Int. Cl.
*H04L 45/00* (2022.01)
*H04L 12/46* (2006.01)
*H04L 45/745* (2022.01)

(52) U.S. Cl.
CPC .......... *H04L 45/22* (2013.01); *H04L 12/4633* (2013.01); *H04L 45/745* (2013.01)

(58) Field of Classification Search
CPC ... H04L 45/22; H04L 12/4633; H04L 45/745; H04L 45/42; H04L 45/28
See application file for complete search history.

(56) References Cited

U.S. PATENT DOCUMENTS

| | | | |
|---|---|---|---|
| 9,344,359 B1 * | 5/2016 | Tiruveedhula | .......... H04L 45/16 |
| 9,660,897 B1 | 5/2017 | Gredler | |
| 2012/0092986 A1 | 4/2012 | Chen | |
| 2012/0243406 A1 | 9/2012 | Allan | |
| 2013/0016605 A1 | 1/2013 | Chen | |

(Continued)

FOREIGN PATENT DOCUMENTS

| | | |
|---|---|---|
| CN | 103493443 A | 1/2014 |
| CN | 105075195 A | 11/2015 |

(Continued)

OTHER PUBLICATIONS

Previdi, S., Filsfils, C., Jain, D., Mattes, P., Rosen, E., and S. Lin, "Advertising Segment Routing Policies in BGP", draft-ietf-idr-segment-routing-te-policy-06, May 2019, 40 pages.

(Continued)

*Primary Examiner* — Donald L Mills
(74) *Attorney, Agent, or Firm* — Conley Rose, P.C.

(57) ABSTRACT

A network node including a memory and a processor coupled to the memory. The processor configured to receive instructions from the memory which, when executed by the processor, cause the network node to receive a path computation request; calculate a first path from a first ingress node to an egress node; calculate a second path from a second ingress node to the egress node; transmit a first message using border gateway protocol (BGP), the first message comprising the first path to the first ingress node; and transmit a second message using BGP, the second message comprising the second path and an ingress protection indicator to the second ingress node.

20 Claims, 11 Drawing Sheets

(56) References Cited

U.S. PATENT DOCUMENTS

| | | | |
|---|---|---|---|
| 2014/0269421 A1 | 9/2014 | Previdi et al. | |
| 2014/0369185 A1 | 12/2014 | Chen | |
| 2015/0030026 A1 | 1/2015 | Kumar et al. | |
| 2015/0043383 A1 | 2/2015 | Farkas et al. | |
| 2015/0109902 A1* | 4/2015 | Kumar | H04L 45/22 370/219 |
| 2015/0304206 A1* | 10/2015 | Filsfils | H04L 45/46 709/238 |
| 2016/0173366 A1 | 6/2016 | Saad et al. | |
| 2017/0005922 A1 | 1/2017 | Tantsura et al. | |
| 2017/0257228 A1 | 9/2017 | Chen | |
| 2017/0317929 A1 | 11/2017 | Chen et al. | |
| 2018/0077051 A1* | 3/2018 | Nainar | H04L 45/745 |
| 2019/0058657 A1 | 2/2019 | Chunduri et al. | |

FOREIGN PATENT DOCUMENTS

| | | |
|---|---|---|
| CN | 105191230 A | 12/2015 |
| CN | 105634940 A | 6/2016 |
| CN | 105704019 A | 6/2016 |
| CN | 107786442 A | 3/2018 |
| CN | 108055878 A | 5/2018 |
| CN | 108781182 A | 11/2018 |
| EP | 2645646 A1 | 10/2013 |
| WO | 2012048666 A1 | 4/2012 |

OTHER PUBLICATIONS

Patel, K., Velde, G., Ramachandra, S., and E. Rosen, "The BGP Tunnel Encapsulation Attribute", draft-ietf-idrtunnel-encaps-12, May 2019, 42 pages.

Bradner, S., "Key words for use in RFCs to IndicateRequirement Levels", BCP 14, RFC 2119, DOI 10.17487/RFC2119, Mar. 1997, <https://www.rfc-editor.org/info/rfc2119>, 3 pages.

Ginsberg, L., Previdi, S., and Y. Yang, "IS-IS Flooding Scope Link State PDUs (LSPs)", RFC 7356, DOI 10.17487/RFC7356, Sep. 2014, <https://www.rfc-editor.org/info/rfc7356>, 23 pages.

Bashandy, A., Filsfils, C., Decraene, B., Litkowski, S., Francois, P., daniel.voyer@bell.ca, d., Clad, F., and P. Camarillo, "Topology Independent Fast Reroute using Segment Routing", draft-bashandy-rtgwg-segment-routing-ti-lfa-05, Oct. 2018, 19 pages.

Hegde, S., Bowers, C., Litkowski, S., Xu, X., and F. Xu, "Node Protection for SR—TE Paths", draft-hegde-springnode-protection-for-sr-te-paths-04, Oct. 2018, 11 pages.

Hu, Z., Chen, H., Yao, J., Bowers, C., and Y. Zhu, "SR—TE Path Midpoint Protection", draft-hu-spring-segmentrouting-proxy-forwarding-03, Apr. 2019, 20 pages.

Filsfils, C., Sivabalan, S., daniel.voyer@bell.ca, d., bogdanov@google.com, b., and P. Mattes, "Segment Routing Policy Architecture", draft-ietf-spring-segment-routingpolicy-03, May 2019, 33 pages.

Sivabalan, S., Filsfils, C., Tantsura, J., Hardwick, J., Previdi, S., and C. Li, "Carrying Binding Label/Segment-ID in PCE-based Networks.", draft-sivabalan-pce-bindinglabel-SID-06, Feb. 2019, 13 pages.

Narten, T. and H. Alvestrand, "Guidelines for Writing an IANA Considerations Section in RFCs", RFC 5226, DOI 10.17487/RFC5226, May 2008, <https://www.rfc-editor.org/info/rfc5226>, 27 pages.

Andersson, L. and R. Asati, "Multiprotocol Label Switching (MPLS) Label Stack Entry: "EXP" Field Renamed to "Traffic Class" Field", RFC 5462, DOI 10.17487/RFC5462, Feb. 2009, <https://www.rfc-editor.org/info/rfc5462>, 9 pages.

Marques, P., Sheth, N., Raszuk, R., Greene, B., Mauch, J., and D. McPherson, "Dissemination of Flow Specification Rules", RFC 5575, DOI 10.17487/RFC5575, Aug. 2009, <https://www.rfc-editor.org/info/rfc5575>, 22 pages.

Wang, J., "Research on Traffic Engineering and QoS Based on MPLS," CNKI, 2005, 2 pages (abstract).

Okamoto, S., et al., "Multi-ASON and GMPLS network domain interworking challenges," in IEEE Communications Magazine, vol. 46, No. 6, doi: 10.1109/MCOM.2008.4539471, Jun. 2008, pp. 88-93.

* cited by examiner

Bit 0: Optional bit. The attribute is optional/well-known if it is 1/0.
Bit 1: Transitive bit. The attribute is transitive/non-transitive if it is 1/0.
Bit 2: Partial bit. The attribute is partial/complete if it is 1/0.
Bit 3: Extended Length. The Length is 1/2-octet if it is 0/1.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| sub-TLV Type  |  Length (1 or 2 bytes)        |Value(variable)~
+-+-+-+-+-+-+-+-+-+-+-+-+-+-+-+-+-+-+-+-+-+-+-+-+-+-+-+-+-+-+-+-+
                        Format of sub-TLV
```

FIG. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Type (TBD4)  |      Length (variable)        |    Flags    |A|
+-+-+-+-+-+-+-+-+-+-+-+-+-+-+-+-+-+-+-+-+-+-+-+-+-+-+-+-+-+-+-+-+
//                    sub-sub-TLVs (optional)                  //
+-+-+-+-+-+-+-+-+-+-+-+-+-+-+-+-+-+-+-+-+-+-+-+-+-+-+-+-+-+-+-+-+
              SR Tunnel Ingress Protection sub-TLV
```

FIG. 6

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|   Type (5)    |  Length (16)  |
+-+-+-+-+-+-+-+-+-+-+-+-+-+-+-+-+-+-+-+-+-+-+-+-+-+-+-+-+-+-+-+-+
|                     Service ID (16 octets)                   ~
+-+-+-+-+-+-+-+-+-+-+-+-+-+-+-+-+-+-+-+-+-+-+-+-+-+-+-+-+-+-+-+-+

128 Bits Service ID sub-sub-TLV
```

FIG. 11

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|   Type (6)    |Length(variable|
+-+-+-+-+-+-+-+-+-+-+-+-+-+-+-+-+-+-+-+-+-+-+-+-+-+-+-+-+-+-+-+-+
| IP Prefix Len |         IP    Prefix                         ~
+-+-+-+-+-+-+-+-+-+-+-+-+-+-+-+-+-+-+-+-+-+-+-+-+-+-+-+-+-+-+-+-+
                     IPv4/6 FEC sub-sub-TLV
```

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|    Type (8)   |   Length (4)  |
+-+-+-+-+-+-+-+-+-+-+-+-+-+-+-+-+-+-+-+-+-+-+-+-+-+-+-+-+-+-+-+-+
|                    Interface Index (4 octets)                 |
+-+-+-+-+-+-+-+-+-+-+-+-+-+-+-+-+-+-+-+-+-+-+-+-+-+-+-+-+-+-+-+-+
                     Interface Index sub-sub-TLV
```

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|   Type (9/10) | Length (4/16) |
+-+-+-+-+-+-+-+-+-+-+-+-+-+-+-+-+-+-+-+-+-+-+-+-+-+-+-+-+-+-+-+-+
|             Interface IPv4/6 Address (4/16 octets)            ~
+-+-+-+-+-+-+-+-+-+-+-+-+-+-+-+-+-+-+-+-+-+-+-+-+-+-+-+-+-+-+-+-+
                    Interface IP Address sub-sub-TLV
```

FIG. 14

EXTENDING BGP PROTECTION FOR SR PATH INGRESS PROTECTION

CROSS-REFERENCE TO RELATED APPLICATIONS

This patent application claims the benefit of Patent Cooperation Treaty Patent Application No. PCT/US20/036117 filed Jun. 4, 2020, which claims priority to U.S. Provisional Patent Application No. 62/857,684 filed Jun. 5, 2019, both of which are hereby incorporated by reference.

TECHNICAL FIELD

This disclosure is related to the technical field of segment routing (SR), in particular SR path ingress protection.

BACKGROUND

Data is transmitted over a network in data packets. Data packets typically include a header that includes information that is used to route the data packet from a source to a destination. Segment routing (SR) is a type of source routing used for transmitting data packets. When using SR, a data source chooses a path, sometimes referred to as a tunnel, and encodes the path into a header of a data packet. The path includes a plurality of nodes and links between the nodes. The nodes include routers, switches, or other devices capable of routing packets in a network. Links may be identified as segments from one node to another node. A list of segments that the data packet will travel across during transit from a source to a destination is included in a header of each data packet. Segments are identified in the header of the data packet by a segment identifier (SID).

SUMMARY

A first aspect relates to a network node comprising a processor coupled to the memory, the processor configured to receive instructions from the memory which, when executed by the processor, cause the network node to receive a path route computation request; calculate a first path route from a first ingress node to an egress node; calculate a second path route from a second ingress node to the egress node; transmit a first message using border gateway protocol (BGP), the first message comprising the first path route to the first ingress node; and transmit a second message using BGP, the second message comprising the second path route and an ingress protection indicator to the second ingress node. It should be noted that speaking strictly, a path is a physical item while a path route is information that describes the path. More loosely, and commonly, the term path may be used to refer to one or both of the actual path or the path route information. The context of its use should make clear what is being discussed. Accordingly, subsequent uses of the term "path" should be understood to include both possibilities.

By transmitting a second message using BGP, the second message comprising the second path and an ingress protection indicator to the second ingress node, protections are provided for an ingress node using BGP.

In a first implementation form of the network node according to the first aspect as such, the first message comprises a plurality of segment identifiers of the first path, and wherein the second message comprises another plurality of segment identifiers of the second path.

In a second implementation form of the network node according to the first aspect as such, the second message is a BGP UPDATE message, and wherein the ingress protection indicator comprises a segment routing (SR) ingress protection sub-type-length-value (sub-TLV).

In a third implementation form of the network node according to the first aspect as such, the SR ingress protection sub-TLV comprises a primary ingress address sub-sub-TLV indicating an address of the first ingress node.

In a fourth implementation form of the network node according to the first aspect as such, the SR ingress protection sub-TLV further comprises a service sub-sub-TLV comprising either a service label of a service carried on the first path or a service identifier of the service.

In a fifth implementation form of the network node according to the first aspect as such, the SR ingress protection sub-TLV further comprises a traffic sub-sub-TLV comprising a description of traffic carried on the first path.

In a sixth implementation form of the network node according to the first aspect as such, the second message comprises a flag, the flag instructing the second ingress node to set an entry for the second path in a forwarding information base (FIB) to an active state.

In a seventh implementation form of the network node according to the first aspect as such, the first ingress node and the second ingress node are connected to a traffic source.

A second aspect relates to a method for source routing ingress protection by a border gateway protocol (BGP) controller, the method comprising receiving a path computation request; calculating a first path from a first ingress node to an egress node; calculating a second path from a second ingress node to the egress node; transmitting a first message using BGP, the first message comprising the first path to the first ingress node; and transmitting a second message using BGP, the second message comprising the second path and an ingress protection indicator to the second ingress node.

The method provides techniques that establish protections for an ingress node using BGP.

In a first implementation form of the method according to the second aspect as such, the first message comprises a plurality of segment identifiers of the first path, and wherein the second message comprises another plurality of segment identifiers of the second path.

In a second implementation form of the method according to the second aspect as such, the second message is a BGP UPDATE message, and wherein the ingress protection indicator comprises a segment routing (SR) ingress protection sub-type-length-value (sub-TLV).

In a third implementation form of the method according to the second aspect as such, the SR ingress protection sub-TLV comprises a primary ingress address sub-sub-TLV indicating an address of the first ingress node.

In a fourth implementation form of the method according to the second aspect as such, the SR ingress protection sub-TLV further comprises a service sub-sub-TLV comprising either a service label of a service carried on the first path or a service identifier of the service.

In a fifth implementation form of the method according to the second aspect as such, the SR ingress protection sub-TLV further comprises a traffic sub-sub-TLV comprising a description of traffic carried on the first path.

In a sixth implementation form of the method according to the second aspect as such, the second message comprises a flag, the flag instructing the second ingress node to set an entry for the second path in a forwarding information base (FIB) to an active state.

In a sixth implementation form of the method according to the second aspect as such, the first ingress node and the second ingress node are connected to a traffic source A third aspect relates to a non-transitory computer readable medium comprising instructions that, when executed by a processor, cause the processor to receive a path computation request; calculate a first path from a first ingress node to an egress node; calculate a second path from a second ingress node to the egress node; transmit a first message using border gateway protocol (BGP), the first message comprising the first path to the first ingress node; and transmit a second message using BGP, the first message comprising the second path and an ingress protection indicator to the second ingress node.

The non-transitory computer readable medium includes computer instructions to establish protections for an ingress node using BGP.

In a first implementation form of the non-transitory computer readable medium according to the third aspect as such, the first message comprises a plurality of segment identifiers of the first path, and wherein the second message comprises another plurality of segment identifiers of the second path.

In a second implementation form of the non-transitory computer readable medium according to the third aspect as such, the second message is a BGP UPDATE message, and wherein the ingress protection indicator comprises a segment routing (SR) ingress protection sub-type-length-value (sub-TLV).

In a third implementation form of the non-transitory computer readable medium according to the third aspect as such, the SR ingress protection sub-TLV comprises a primary ingress address sub-sub-TLV indicating an address of the first ingress node.

In a fourth implementation form of the non-transitory computer readable medium according to the third aspect as such, the SR ingress protection sub-TLV further comprises a service sub-sub-TLV comprising either a service label of a service carried on the first path or a service identifier of the service.

In a fifth implementation form of the non-transitory computer readable medium according to the third aspect as such, the SR ingress protection sub-TLV further comprises a traffic sub-sub-TLV comprising a description of traffic carried on the first path.

In a sixth implementation form of the non-transitory computer readable medium according to the third aspect as such, the second message comprises a flag, the flag instructing the second ingress node to set an entry for the second path in a forwarding information base (FIB) to an active state In a seventh implementation form of the non-transitory computer readable medium according to the third aspect as such, the first ingress node and the second ingress node are connected to a traffic source.

A fourth aspect relates to a means for tunnel ingress protection, the means comprising receiving means configured to receive a path computation request; processing means coupled to the receiving means, the processing means configured to calculate a first path from a first ingress node to an egress node; and calculate a second path from a second ingress node to a destination node; and transmitting means coupled to the processing means, the transmitting means configured to transmit a first message using border gateway protocol (BGP) comprising the first path to the first ingress node; and a second message using BGP comprising the second path and an ingress protection indicator to the second ingress node.

A fifth aspect relates to a network node comprising a memory; and a processor coupled to the memory, the processor configured to receive instructions from the memory which, when executed by the processor, cause the network node to receive a message using border gateway protocol (BGP) comprising a path and an ingress protection indicator; create an entry in a forwarding information base (FIB) based on the message; and set a state of the entry based on the message, the state comprising either active or inactive.

By receiving a message using BGP, the second message comprising a path and an ingress protection indicator, protections are provided for an ingress node using BGP In a first implementation form of the network node according to the fifth aspect as such, the instructions further cause the network node to transmit traffic associated with the path when the state is set to active.

In a second implementation form of the network node according to the fifth aspect as such, the instructions further cause the network node to drop traffic associated with the path when the state is set to inactive.

In a third implementation form of the network node according to the fifth aspect as such, the instructions further cause the network node to detect a primary ingress node failure; and set, responsive to the primary ingress node failure, the state to active.

In a fourth implementation form of the network node according to the fifth aspect as such, the message is a BGP UPDATE message, and wherein the ingress protection indicator comprises a segment routing (SR) ingress protection sub-type-length-value (sub-TLV).

A sixth aspect relates to a method for source routing ingress protection by a network node, the method comprising receiving a message using border gateway protocol (BGP) comprising a path and an ingress protection indicator; creating an entry in a forwarding information base (FIB) based on the message; and setting a state of the entry based on the message, the state comprising either active or inactive.

The method provides techniques that establish protections for an ingress node using BGP.

In a first implementation form of the method according to the sixth aspect as such, the method further comprises transmitting traffic associated with the path when the state is set to active.

In a second implementation form of the method according to the sixth aspect as such, the method further comprises dropping traffic associated with the path when the state is set to inactive.

In a third implementation form of the method according to the sixth aspect as such, the method further comprises detecting a primary ingress node failure; and setting, responsive to the primary ingress node failure, the state to active.

In a fourth implementation form of the method according to the sixth aspect as such, the message is a BGP UPDATE message, and wherein the ingress protection indicator comprises a segment routing (SR) ingress protection sub-type-length-value (sub-TLV).

A seventh aspect relates to a non-transitory computer readable medium comprising instructions that, when executed by a processor, cause the processor to receive a message using border gateway protocol (BGP) comprising a path and an ingress protection indicator; create an entry in a forwarding information base (FIB) based on the message; and set a state of the entry based on the message, the state comprising either active or inactive.

The non-transitory computer readable medium establishes protections for an ingress node using BGP.

In a first implementation form of the non-transitory computer readable medium according to the seventh aspect as such, the instructions further cause the processor to transmit traffic associated with the path when the state is set to active.

In a second implementation form of the non-transitory computer readable medium according to the seventh aspect as such, the instructions further cause the processor to drop traffic associated with the path when the state is set to inactive.

In a third implementation form of the non-transitory computer readable medium according to the seventh aspect as such, the instructions further cause the processor to detect a primary ingress node failure; and set, responsive to the primary ingress node failure, the state to active.

In a fourth implementation form of the non-transitory computer readable medium according to the seventh aspect as such, the message is a BGP UPDATE message, and wherein the ingress protection indicator comprises a segment routing (SR) ingress protection sub-type-length-value (sub-TLV).

An eighth aspect relates to a means for tunnel ingress protection, the means comprising receiving means configured to receive a message using border gateway protocol (BGP) comprising a path and an ingress protection indicator; and processing means coupled to the receiving means, the processing means configured to create an entry in a forwarding information base (FIB) based on the message; and set a state of the entry based on the message, the state comprising either active or inactive.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a diagram of an embodiment of a sub-TLV format.

FIG. 6 is a diagram of an embodiment of a SR tunnel ingress protection sub-TLV.

FIG. 11 is a diagram of an embodiment of a 128-bit service ID sub-sub-TLV.

FIG. 12 is a diagram of an embodiment of a FEC sub-sub-TLV.

FIG. 13 is a diagram of an embodiment of an interface index sub-sub-TLV.

FIG. 14 is a diagram of an embodiment of an interface IP address sub-sub-TLV.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The ingress node is a key component of the SR tunnel because the whole path/tunnel may depend on the ingress node to add the source route into the packets to be transported by the tunnel. In some approaches, ingress protection may be provided in a path computation element (PCE) protocol based network. However, there is currently no mechanism for protecting the ingress node (also referred to herein as an ingress) of the SR tunnel in a border gateway protocol (BGP) based network. BGP based networks currently use a different protocol for ingress protection. The embodiments disclosed herein provide protections for the ingress node of the SR tunnel in a BGP based network.

Figure 1:
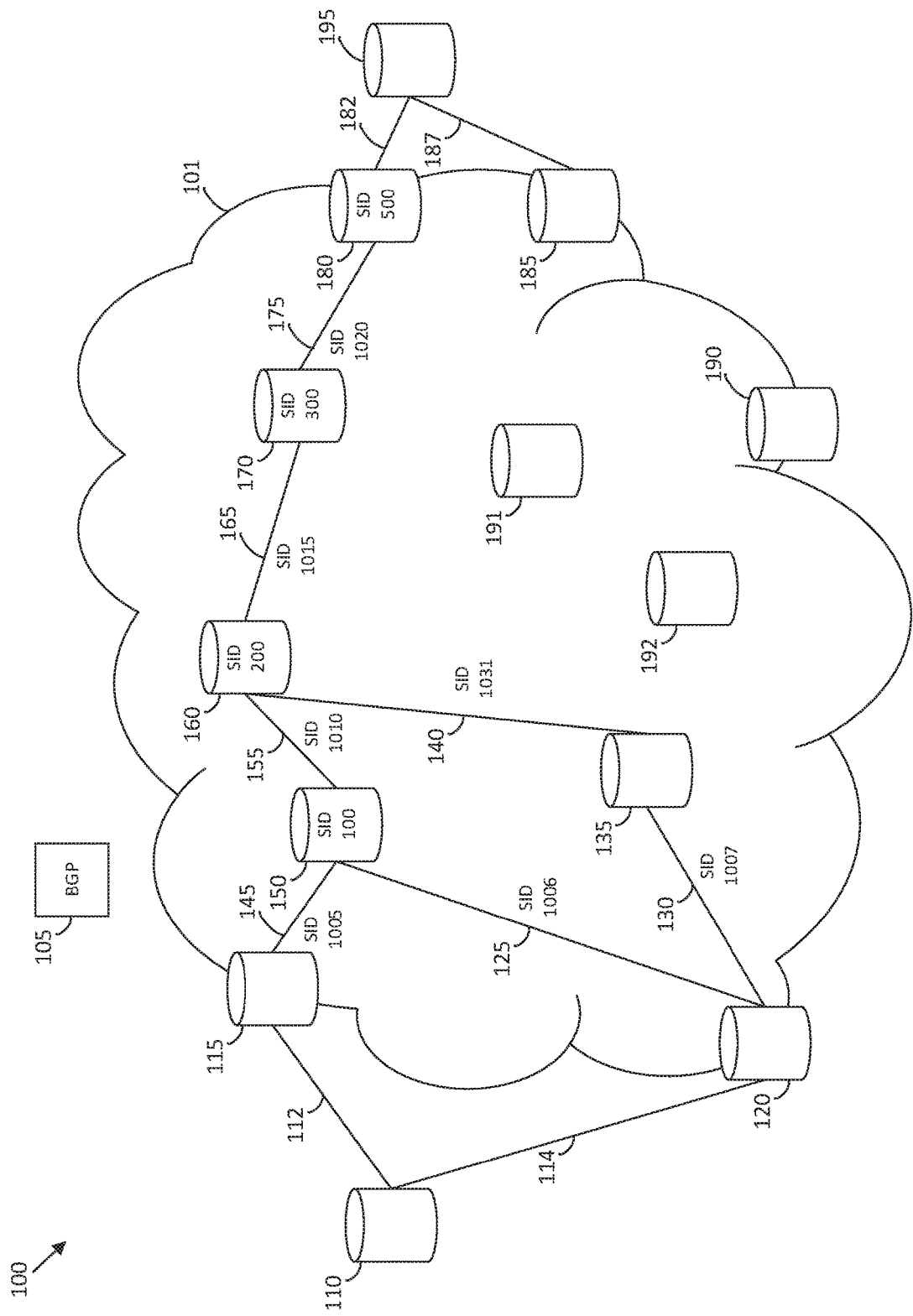
FIG. 1 is an embodiment of a network diagram illustrating nodes and segments in a tunnel with a backup ingress node.

FIG. 1 is an embodiment of a network diagram 100 illustrating nodes and segments in a tunnel with a backup ingress node. The edge nodes 115 and 120 are configured to operate using BGP protocol and maybe configured as ingress nodes. An edge node refers to a node that is on the edge of a provider network. For example, provider network 101 includes edge node 115, edge node 120, edge node 180, edge node 185, and edge node 190. Intermediate nodes in the provider network 101 include nodes 135, 150, 160, 170, 191, and 192. A customer edge node 110 provides data to the provider network 101 for routing to a receiving customer edge node 195. Links 112, 114, 125, 130, 140, 145, 155, 165, 175, 182, and 187 connect devices for communication purposes. The links 112, 114, 125, 130, 140, 145, 155, 165, 175, 182, and 187 may be wired (e.g., physical) or wireless and may communicate using various communication protocols. In other embodiments, any number of edge nodes, intermediate nodes, and segments/links may be present in a network.

Some edge nodes may be configured as ingress nodes or backup ingress nodes. To protect against failure of a primary ingress node, a backup ingress node may be selected and configured for ingress protection. In this example, edge node 115 is configured as the primary ingress node and edge node 120 is configured as the backup ingress node. A backup ingress node for a tunnel may be off-tunnel or on-tunnel. An off-tunnel backup ingress node refers to a backup ingress node that is not on the SR tunnel (e.g., edge node 120 is off-tunnel regarding an SR tunnel from edge node 115 to edge node 180). An on-tunnel backup ingress node refers to a backup ingress that is on the SR tunnel (e.g., node 160 is on the SR tunnel from edge node 115 to edge node 180). The terms SR tunnel and SR path may be interchangeable in the embodiments disclosed herein.

A BGP controller 105 may compute a backup path after creation of a primary path (e.g., the SR path from edge node 115 to edge node 180 via node 150, node 160, and node 170) through a network. The backup path may be from edge node 120 to edge node 180 via a downstream node (e.g., node 150 or node 160) of the edge node 115. The downstream node is part of a primary SR tunnel (e.g., the SR tunnel from edge node 115 to edge node 180 via node 150, node 160, and node 170). The backup path may satisfy given constrains if any constraints are given, for example Quality of Service (QoS), number of hops, shortest path, etc.

The BGP controller 105 may create a backup SR tunnel from the backup ingress node (e.g., edge node 120) to the downstream node (e.g., node 150, node 160, or node 170) to the egress node (edge node 180) by allocating a list of segment identifiers (SIDs) or labels for the backup SR tunnel segment along the backup path. The BGP controller 105 may also store the list for the backup SR tunnel and associate the list with the primary ingress (edge node 115) of the primary SR tunnel.

In an embodiment, nodes 150, 160, 170 and edge node 180 have node-SIDs 100, 200, 300 and 500 respectively, and links 145, 125, 130, 140, 155, 165, and 175 have adjacency-SIDs 1005, 1006, 1007, 1031, 1010, 1015, and 1020, respectively. The foregoing SIDs are merely examples of possible SIDs, any other type or length of identifier may be used. A tunnel may be defined by a list of SIDs. Any combination of node SIDs and/or link SIDs may be used. In one example, the path from edge node 115 to node 150 to node 160 to node 170 to edge node 180 for the primary SR tunnel is an explicit path satisfying a set of constraints, but not a shortest path from edge node 115 to edge node 180. In an embodiment, the list of SIDs for the primary SR tunnel {1005, 1010, 1015, 1020} may be allocated and sent to edge node 115 by BGP controller 105. For packets imported into the primary SR tunnel, edge node 115 may add {1010, 1015, 1020} to the packet header and send the packet to node 150 through link 145. In an embodiment, the BGP controller 105 computes a backup path from edge node 120 to node 150 to node 160 to node 170 to edge node 180 satisfying the constraints. The BGP controller 105 sends the backup path having the segment list {1006, 1010, 1015, 1020} to the edge node 120. In another embodiment, the BGP controller 105 computes a backup path from edge node 120 to node 150 to node 160 to node 170 to edge node 180 satisfying the constraints. The BGP controller 105 sends the backup path having the segment list {1006, 1010, 1015, 1020} to the edge node 120.

After receiving the segment list from the BGP controller 105, edge node 120 may create a forwarding entry, which adds {1010, 1015, 1020} into a header of a packet to be carried by the primary SR tunnel when the primary ingress node fails. Edge node 120 may send the packets to node 150 through link 125 when edge node 115 fails. The BGP controller 105 may compute an alternative backup path (edge node 120 to node 135 to node 160 to node 170 to edge node 180) from the backup ingress node (edge node 120) satisfying constraints. This backup path has a segment list {1007, 1031, 1015, 1020} and may be sent to the backup ingress node (edge node 120). After receiving the segment list from the BGP controller 105, edge node 120 may create a forwarding entry, which adds {1031, 1015, 1020} into a header of a packet to be carried by the primary SR tunnel. Edge node 120 may then send the packet to node 135 through link 130 when edge node 115 fails.

In another embodiment, the path for the primary SR tunnel is a shortest path from the primary ingress (edge node 115) to node 160 plus a shortest path from node 160 to an egress node (edge node 180). In the case where shortest path is desired, SIDs for the nodes may be used in the path list rather than SIDs for the links. In this case, the list of SIDs for the primary SR tunnel {200, 500} is sent to edge node 115 by BGP controller 105. In an embodiment, after receiving the list, edge node 115 creates a forwarding entry which adds {200, 500} into a packet to be transported by the SR tunnel. Because no links are identified in the forwarding entry, the shortest path between the edge node 115 and node 160 (SID 200) and the shortest path between node 160 and edge node 180 (SID 500) may be selected.

To compute the backup SR tunnel, the BGP controller 105 computes a shortest path from the backup ingress node (edge node 120) to the downstream node 160 without going through the primary ingress (edge node 115). In an embodiment, the cost of each link along SR tunnel is 2 while the cost of any other link may be 1, and there is a shortest path from edge node 120 to node 160 without edge node 115 (e.g., edge node 120 to node 135 to node 160 is a shortest path). This shortest path may have the same segment list {200, 500}, and the BGP controller 105 may send the list to the backup ingress node (edge node 120). After receiving the list from BGP controller 105, edge node 120 may create a forwarding entry, which adds {200, 500} into the packet to be transported by the SR tunnel when edge node 115 fails. Edge node 120 may then send the packet along the shortest path to node 160 via node 135 when edge node 115 fails.

In some embodiments, the BGP controller 105 may send any combination of the following to the backup ingress node (e.g., edge node 120): 1) an internet protocol (IP) address or other identifier of the primary ingress node; 2) a traffic description, which describes the traffic that the primary SR tunnel carries; 3) a service SID/Label if any, which indicates the service, such as a Virtual Private Network (VPN) service, that the primary SR tunnel transports; and/or 4) information needed for creating a backup SR tunnel, the backup SR tunnel including a backup SR tunnel segment list from the backup ingress node to the egress node of the primary SR tunnel. In one embodiment, the information needed for creating a backup SR tunnel is the backup path from the backup ingress node to the primary egress node and the segment list for the backup path.

In some embodiments, the backup ingress node (e.g., edge node 120) creates a forwarding entry in a forwarding information base (FIB) after receiving the above information. The forwarding entry may be used to: 1) import packets/traffic into the backup SR tunnel according to the traffic description for the primary SR tunnel; 2) push the service SID/Label (if any) into each of the packets to be imported into the backup SR tunnel; 3) push the list of SIDs/Labels for the backup SR tunnel into each of the packets to be imported into the backup SR tunnel; and/or 4) send the packet to the direct downstream node of the backup ingress node along the backup SR tunnel.

The backup ingress node (e.g., edge node 120) may send the BGP controller 105 a report to confirm that the protection is available for the primary ingress node (e.g., edge node 115) after the forwarding entry is created successfully. The BGP controller 105 may record the status of the primary ingress node (e.g., edge node 115) of the primary SR tunnel regarding ingress protection according to the confirmation received from the backup ingress node (e.g., edge node 120).

In a further example, a primary SR tunnel exists between a primary ingress node and a primary egress node through one or more downstream transit nodes. A backup ingress node may be computed or configured to protect the failure of the primary ingress node. A source node (the source of the traffic, e.g., customer edge node 110)) may be connected to the primary ingress node (e.g., edge node 115) and the backup ingress node (e.g., edge node 120).

In an embodiment, the source node (e.g., customer edge node 110) sends the traffic to the primary ingress node for the primary SR tunnel in normal operations. The primary ingress node imports the traffic into the tunnel transporting the traffic to its destination. If the primary ingress node fails, the source node switches the traffic to the backup ingress node (e.g., edge node 120) after detecting the failure. A forwarding entry in the FIB on the backup ingress node imports the traffic into the backup SR tunnel transporting the traffic to its destination.

In another embodiment, the source node sends the traffic to the primary ingress node for the primary SR tunnel. The primary ingress node imports the traffic into the tunnel transporting the traffic to the destination. The source node also sends the traffic to the backup ingress node, which drops the traffic in normal operations through setting the corresponding forwarding entry in the FIB to be inactive. If the primary ingress node fails, the backup ingress node sets the corresponding forwarding entry in the FIB to be active and begins to import the traffic into the backup SR tunnel. The active forwarding entry in the FIB on the backup ingress node imports the traffic into the backup SR tunnel.

The BGP controller 105 may send ingress protection information to the backup ingress node using a BGP UPDATE message. The UPDATE message includes a network reliability reachability information (NLRI) portion with a tunnel encapsulation attribute of type set to 23, where the attribute of type 23 comprises tunnel encapsulation attribute type-length-values (TLVs). The tunnel encapsulation attribute TLV is set to tunnel type 15, indicating a SR policy TLV that includes a number of sub-TLVs. A SR path ingress protection sub-TLV is present in the SR policy sub-TLVs. The SR path ingress protection sub-TLV may include several sub-sub-TLVs. The sub-sub TLVs may include one or more of a primary ingress sub-sub-TLV, a service identifier (ID) sub-sub-TLV, or a traffic description sub-sub-TLV.

Figure 2:
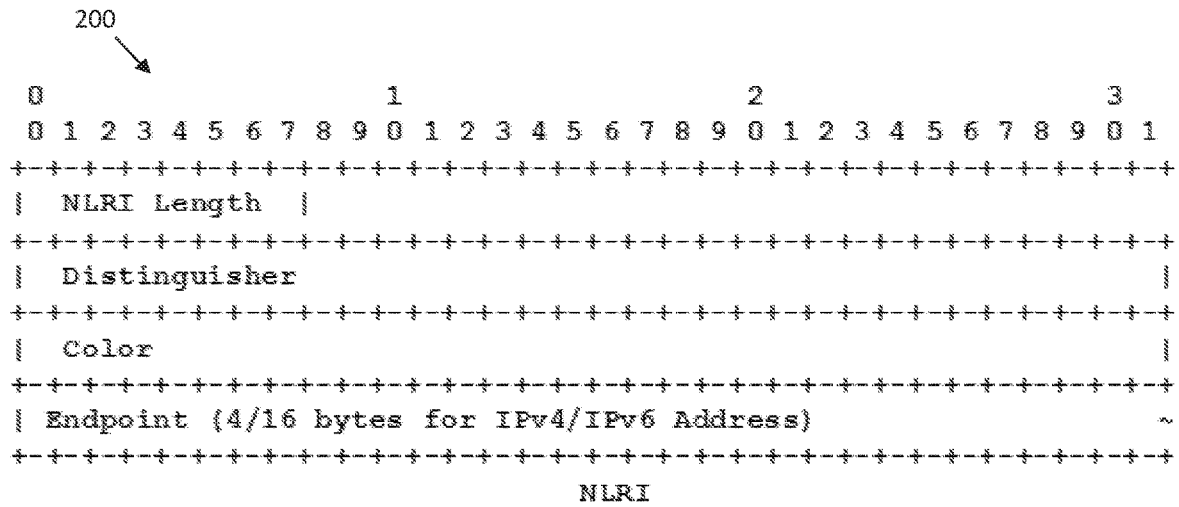
FIG. 2 is a diagram of an embodiment of a NLRI.

FIG. 2 is a diagram of an embodiment of a NLRI 200. The NLRI 200 includes an 8-bit NLRI length field, a 32-bit distinguisher field, a 32-bit color field, and an endpoint field that is either 4 bytes for an IPv4 address or 16 bytes for an IPv6 address of the endpoint.

Figure 3:
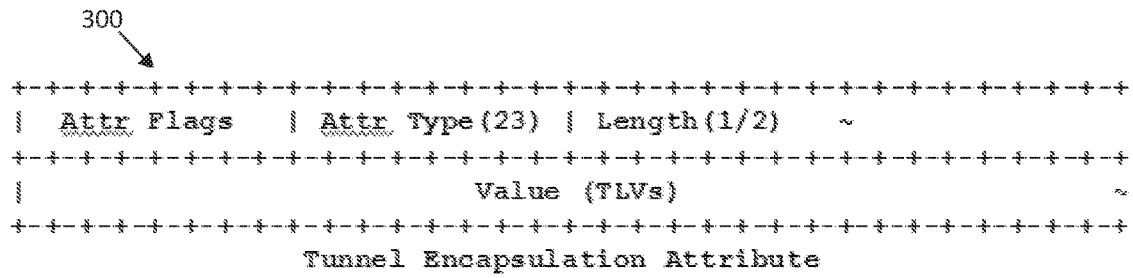
FIG. 3 is a diagram of an embodiment of a tunnel encapsulation attribute.

FIG. 3 is a diagram of an embodiment of a tunnel encapsulation attribute 300. The tunnel encapsulation attribute comprises an 8-bit attributes flags field, an 8-bit attribute type field, a 16-bit length field, and a TLVs field. The attribute flags may be set as follows. Bit 0 is the optional bit. The optional bit indicates whether the attribute is optional or well-known if it is set to 1 or 0 respectively. Bit 1 is the transitive bit. The transitive bit indicates whether the attribute is transitive or non-transitive if it is set to 1 or 0, respectively. Bit 2 is the partial bit. The partial bit indicates whether the attribute is partial or complete if it is set to 1 or 0 respectively. Bit 3 is the extended length bit. The length is either b or 16 bits (i.e. 1 or 2 octets) if it is set to 0 or 1 respectively.

Figure 4:
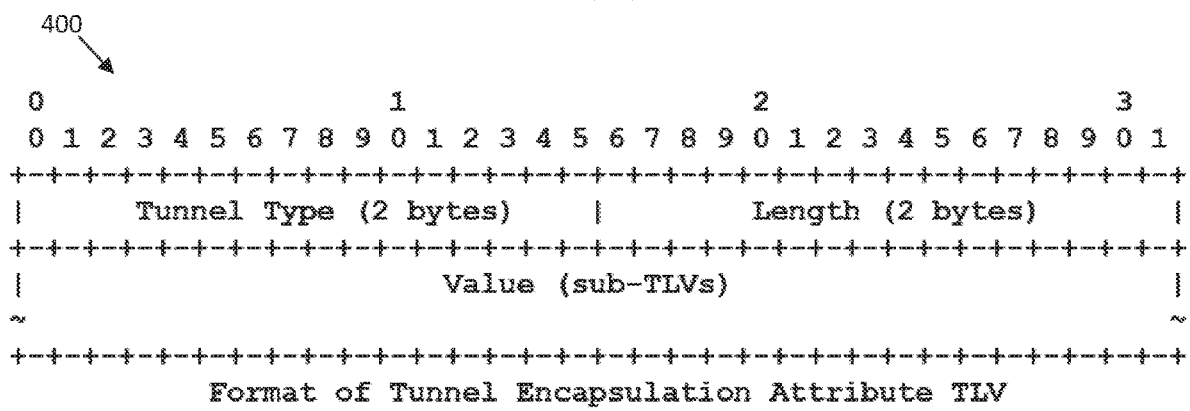
FIG. 4 is a diagram of an embodiment of a tunnel encapsulation attribute TLV.

In this example, the attribute type is set to 23, indicating a tunnel encapsulation attribute. FIG. 4 is a diagram of an embodiment of a tunnel encapsulation attribute TLV 400 found in the TLV field of the tunnel encapsulation attribute 300. The tunnel encapsulation attribute TLV 400 includes a 16-bit tunnel type field, a 16-bit length field, and a sub-TLVs field. FIG. 5 is a diagram of an embodiment of a sub-TLV 500 format. The sub-TLV 500 includes an 8-bit sub-TLV type field, a 8-bit or 16-bit length field, and a variable field with size determined by the length field.

FIG. 6 is a diagram of an embodiment of a SR tunnel ingress protection sub-TLV 600. The SR tunnel ingress protection sub-TLV 500 may be part of a tunnel encapsulation attribute TLV 400. The SR tunnel ingress protection sub-TLV 600 includes an 8-bit type field, a variable-length length field, an 8-bit flags field, and a variable length sub-sub-TLVs field. The flags field may include an 'A' flag of 1 bit. While 'A' is used here, the flag may be named or identified in other ways. When the A flag is set to 1, this requests that a backup ingress node set the forwarding entry for the backup SR path to Active in a forwarding information base (FIB) or BGP table. When the A flag is set to 0, this requests that a backup ingress node set the forwarding entry for the backup SR path to inactive initially and to make the entry active after detecting the failure of the primary ingress node of the primary SR path. The sub-sub-TLVs field may contain a number of sub-sub-TLVs, for example one or more of a service sub-sub TLV, a primary-ingress sub-sub-TLV, and/or a traffic description sub-sub-TLV.

Figure 7:
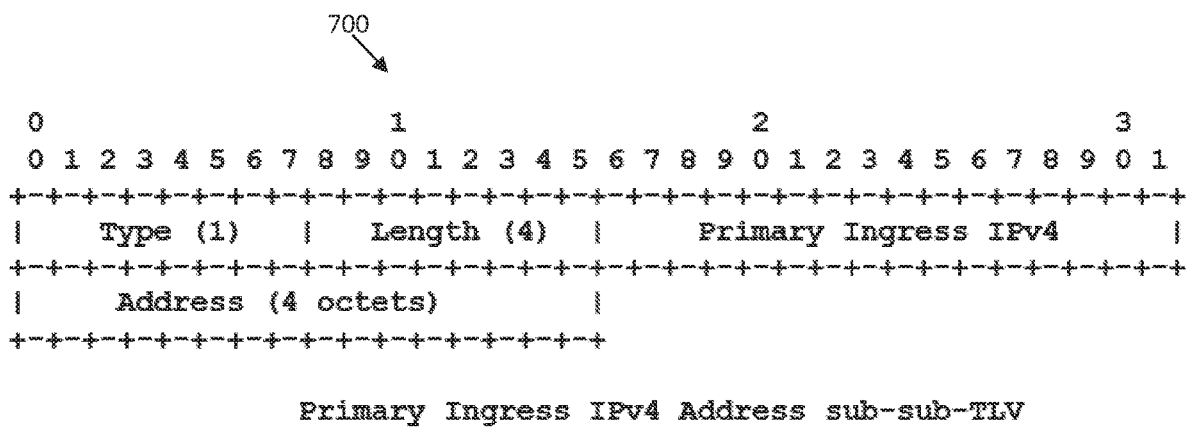
FIG. 7 is a diagram of an embodiment of a primary ingress address sub-sub-TLV for IP version 4 (IPv4).

FIG. 7 is a diagram of an embodiment of a primary ingress address sub-sub-TLV for IP version 4 (IPv4) 700. The primary ingress address sub-sub-TLV for IPv4 700 includes an 8-bit type field, an 8-bit length field, and a 32-bit (4-byte) primary ingress address field for the IPv4 address of the primary ingress node, e.g., edge node 115.

Figure 8:
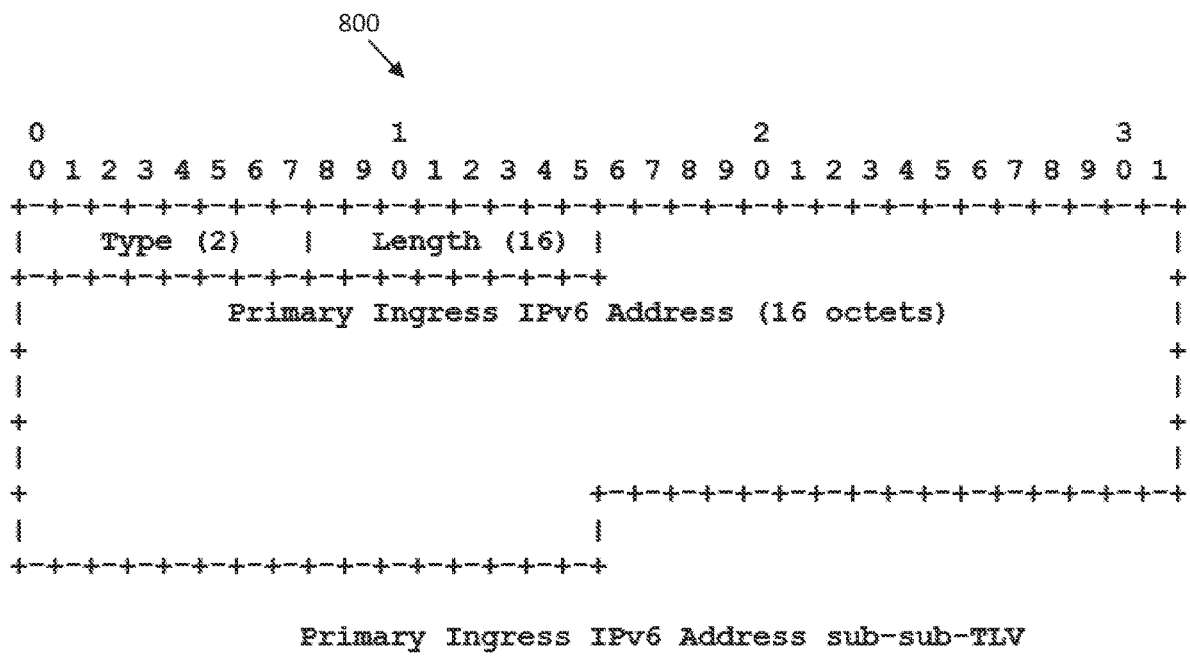
FIG. 8 is a diagram of an embodiment of a primary ingress address sub-sub-TLV for IP version 6 (IPv6).

FIG. 8 is a diagram of an embodiment of a primary ingress address sub-sub-TLV for IP version 6 (IPv6) 800. The primary ingress address sub-sub-TLV for IPv6 800 includes an 8-bit type field, an 8-bit length field, and a 128-bit (16-byte) primary ingress address field for the IPv6 address of the primary ingress node, e.g., edge node 115.

Figure 9:
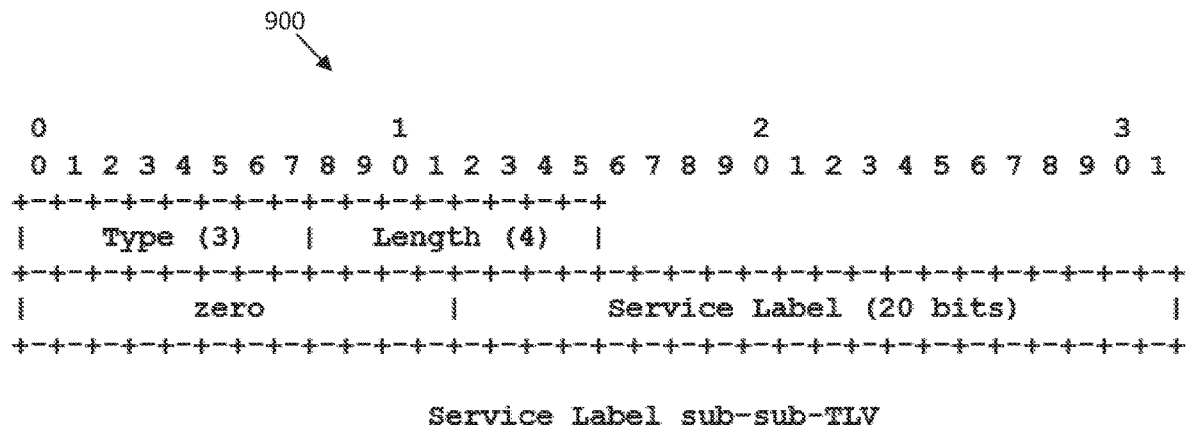
FIG. 9 is a diagram of an embodiment of a service label sub-sub-TLV.
Figure 10:
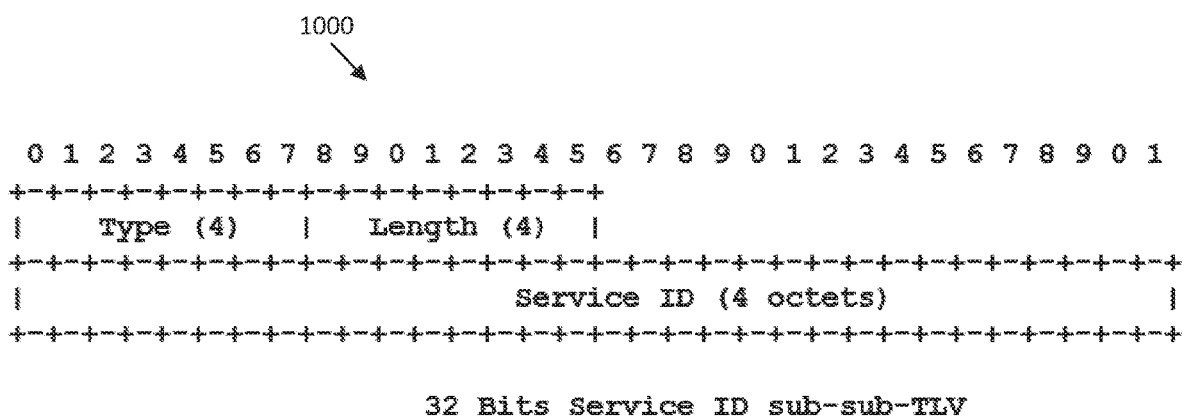
FIG. 10 is a diagram of an embodiment of a 32-bit service ID sub-sub-TLV.

A service sub-sub TLV may contain a service ID or label, e.g., a VPN label, to be added into a packet to be carried by a SR path/tunnel. The service sub-sub TLV may have two formats, one where the service is identified by a label and another where the service is identified by a service ID of 32 or 128 bits. FIG. 9 is a diagram of an embodiment of a service label sub-sub-TLV 900. The service label sub-sub-TLV 900 includes an 8-bit type field, an 8-bit length field, a 12-bit zero pad, and a 20-bit service label field. FIG. 10 is a diagram of an embodiment of a 32-bit service ID sub-sub-TLV 1000. The 32-bit service ID sub-sub-TLV 1000 includes an 8-bit type field, an 8-bit length field, and a 32-bit (4-byte) service ID field. FIG. 11 is a diagram of an embodiment of a 128-bit service ID sub-sub-TLV 1100. The 128-bit service ID sub-sub-TLV 1100 includes an 8-bit type field, an 8-bit length field, and a 128-bit (16-byte) service ID field. When there is a service sub-sub-TLV in the SR path ingress protection sub-TLV, the ID or label in the service sub-sub-TLV will be included in the forwarding entries of data to be sent over the backup path. When a packet is imported into a backup path using the forwarding entries, the service ID or label is pushed first and then the sequence of segments represented in a segment list sub-TLV.

FIG. 12 is a diagram of an embodiment of a Forward Equivalent Class (FEC) sub-sub-TLV 1200 which describes the traffic to be imported into the backup SR tunnel and is an IP prefix. The FEC sub-sub-TLV 1200 includes an 8-bit type field, an 8-bit length field, an 8 bit IP prefix length field, and a variable-length IP prefix field.

FIG. 13 is a diagram of an embodiment of an interface index sub-sub-TLV 1300. The interface index sub-sub-TLV 1300 indicates the interface from which the traffic is received and imported into the backup SR tunnel. The interface index sub-sub-TLV 1300 includes an 8-bit type field, an 8-bit length field, and a 32-bit (4-byte) interface index field. FIG. 14 is a diagram of an embodiment of an interface IP address sub-sub-TLV 1400 that indicates an IP address of the interface from which the traffic is received and imported into the backup SR tunnel. The interface IP address sub-sub-TLV 1400 includes an 8-bit type field, an 8-bit length field, and either a 32-bit or 128-bit IP address field for an IPv4 address or an IPv6 address respectively.

Figure 15:
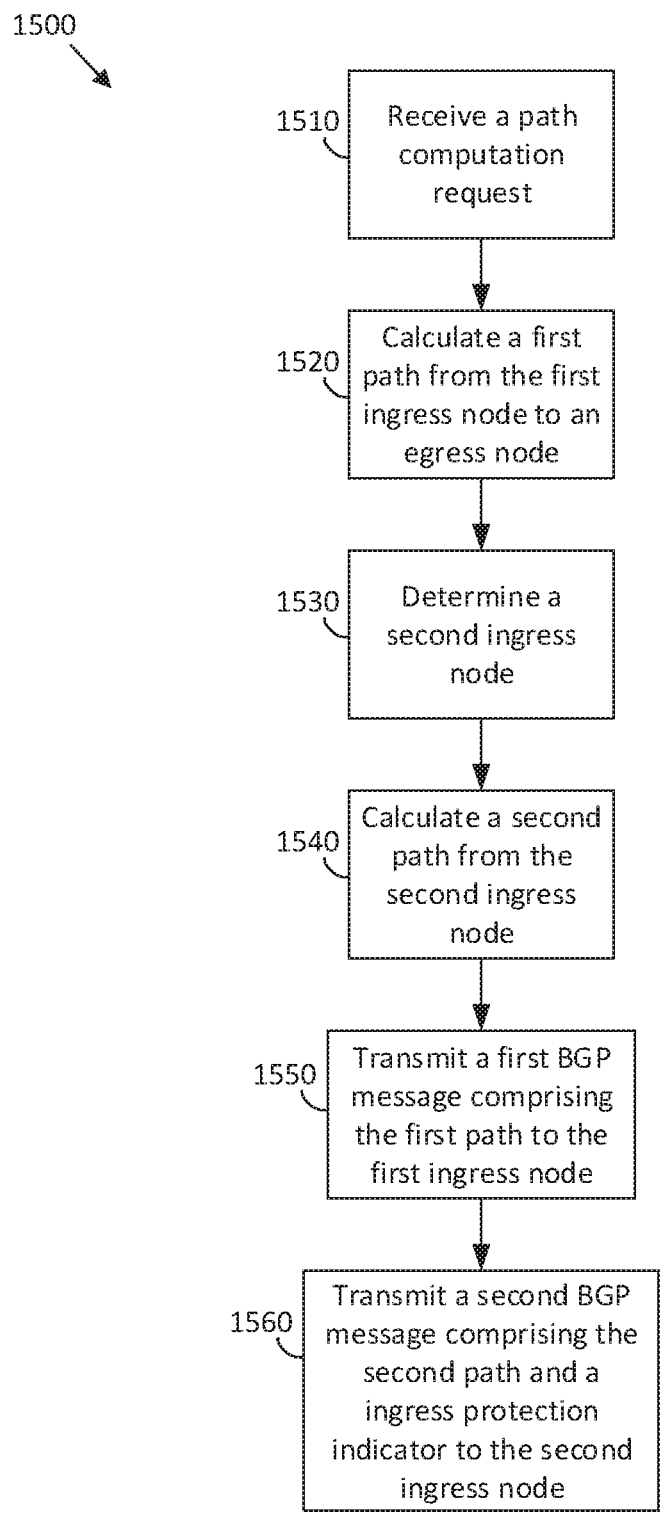
FIG. 15 is a flow diagram of an embodiment of a method for BGP ingress protection at a BGP controller.

FIG. 15 is a flow diagram of an embodiment of a method 1500 for BGP ingress protection at a BGP controller. The method 1500 begins at block 1510 when a BGP controller receives a path computation request. The path computation request may be received from an application that is providing data traffic, a system operator, or some other entity.

The method 1500 continues at block 1520 when the BGP controller calculates a first path from a first ingress node to an egress node. The first path may traverse a network where the first ingress node and egress node are edge nodes of the network. In addition to the first ingress node and egress node, the first path may include any number of additional nodes which may be referred to as downstream nodes, e.g., downstream of the first ingress node. The first ingress node may receive data traffic for transmission via the first path from a customer edge node or some other source of data traffic.

At block 1530, the BGP controller may determine a second ingress node to act as a backup ingress node. The second ingress node is configured to receive data traffic from the same source as the first ingress node. In this configuration, both the first ingress node and the second ingress node may receive data traffic from the same source for transmission to the egress node. In some cases, the source may transmit the data traffic to both the first ingress node and the second ingress node substantially simultaneously or may transmit to only the first ingress node and then to only the second ingress node if the first ingress node fails.

At block 1540, the BGP controller may calculate a second path from the second ingress node to the egress node. The second ingress node is an edge node of the network. The second path may include at least a portion of the first path. For example, the second path may be from the second ingress node to one of the downstream nodes of the first path. From the downstream node, the second path would follow the first path.

At block 1550, the BGP controller may transmit a first message including the first path to the first ingress node. The first message may be a BGP UPDATE message that includes the first path. The first path in the first message may be identified by a list of links that data traffic should traverse in order to reach the egress node. In another case, the first path may be identified by a list of nodes that the data traffic should traverse in order to reach the egress node. The lists may be segment lists where nodes and segments are identified by SIDs.

At block 1560, the BGP controller may transmit a second message including the second path and an ingress protection indicator to the second ingress node. The second message may be a BGP UPDATE message with the second path and a SR tunnel ingress protection sub-TLV, e.g., SR tunnel ingress protection sub-TLV 600. The second path in the second message may be identified by a list of links that data traffic should traverse in order to reach the egress node. In another case, the second path may be identified by a list of nodes that the data traffic should traverse in order to reach the egress node. The lists may be segment lists where nodes and segments are identified by SIDs. The ingress protection indicator may be the SR tunnel ingress protection sub-TLV or some other indicator indicating that the second path is for ingress protection.

Figure 16:
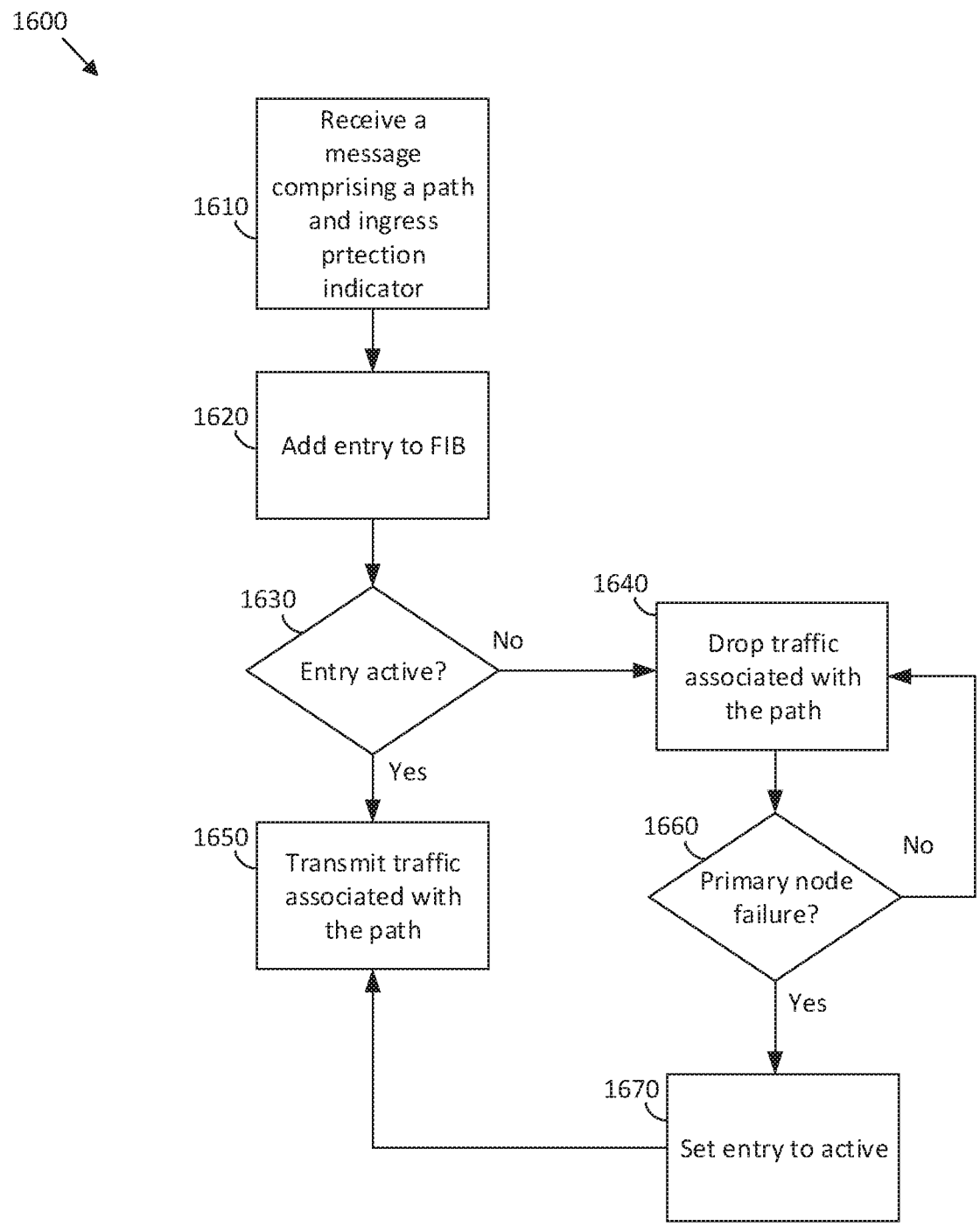
FIG. 16 is a flow diagram of an embodiment of a method for BGP ingress protection at a secondary ingress node.

FIG. 16 is a flow diagram of an embodiment of a method 1600 for BGP ingress protection at a secondary ingress node. The method 1600 begins at block 1610 when an edge node receives a message comprising a path and an ingress protection indicator. The path may indicate a path used for a tunnel between a backup ingress node and an egress node. The message may be a BGP UPDATE message with the path and a SR tunnel ingress protection sub-TLV, e.g., SR tunnel ingress protection sub-TLV 600. The path in the message may be identified by a list of links that data traffic should traverse in order to reach the egress node. In another case, the second path may be identified by a list of nodes that the data traffic should traverse in order to reach the egress node. The lists may be segment lists where nodes and segments are identified by SIDs. The ingress protection indicator may be the SR tunnel ingress protection sub-TLV or some other indicator indicating that the path is for ingress protection.

At block 1620, the edge node may create an entry in a forwarding information base (FIB). The entry may be set to active or inactive based on a flag or other indicator in the message received at block 1610. Block 1630 is a decision point for steps to be taken when the entry is active or when the entry is not active. If the entry is set to active, at block 1650, the edge node will transmit any traffic associated with the path along the path identified in the message. The edge node may determine the traffic is associated with the path based on a description of the type of traffic associated with the path included in the message. The entry may be set to active when a traffic source or customer edge node, e.g., customer edge node 110, that is providing data for transmission along the path is configured to detect a failure in a primary ingress node, e.g., ingress node 115. In this case, the traffic source or customer edge node begins transmitting the traffic to the backup ingress node, e.g., edge node 120, when a failure is detected at the primary ingress node.

Figure 17:
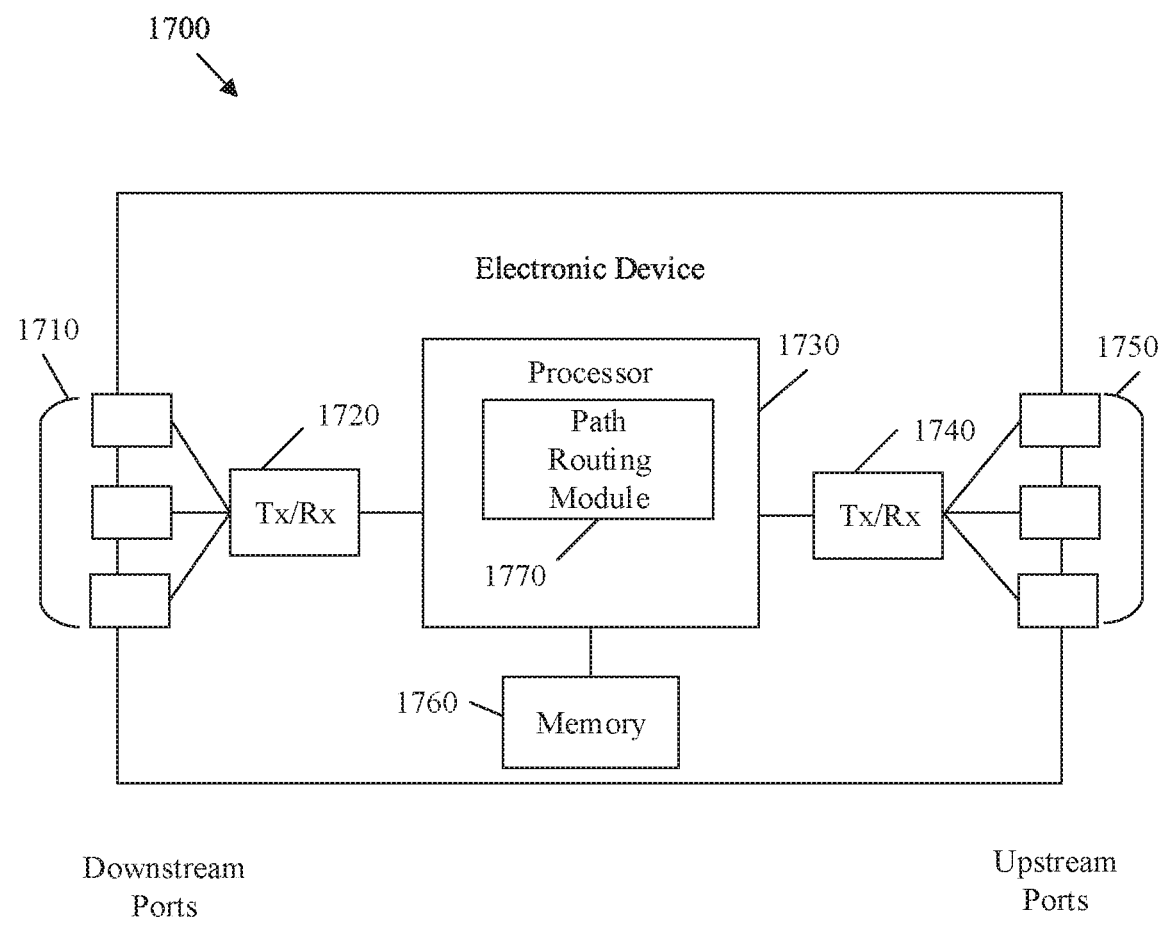
FIG. 17 is a schematic diagram of an electronic device according to an embodiment of the disclosure.

If the entry is not set to active, at block 1640, the edge node will drop any traffic associated with the path identified in the message. At decision point block 1660, the edge node may detect that the primary node has failed. The edge node may receive link state messages. A link-state message may indicate that the primary ingress node has failed. In another case, the edge node may receive some other message indicating that the primary ingress node has failed. If the edge node determines that the primary edge node has failed, the edge note may set the entry in the FIB to active at block 1670 and begin transmitting any traffic associated with the path along the path identified in the message at block 1650. In these cases, the traffic source or customer edge node may transmit the data to both the primary ingress node and backup ingress node substantially simultaneously, or the traffic source or customer edge node begins transmitting the traffic to the backup ingress node when a failure is detected at the primary ingress node FIG. 17 is a schematic diagram of an electronic device 1700 according to an embodiment of the disclosure. The electronic device 1700 is suitable for implementing the disclosed embodiments as described herein. The electronic device 1700 comprises ingress ports 1710 and receiver units (Rx) 1720 for receiving data; a processor, logic unit, or central processing unit (CPU) 1730 to process the data; transmitter units (Tx) 1740 and egress ports 1750 for transmitting the data; and a memory 1760 for storing the data. The electronic device 1700 may also comprise optical-to-electrical (OE) components and electrical-to-optical (EO)

components coupled to the ingress ports 1710, the receiver units 1720, the transmitter units 1740, and the egress ports 1750 for egress or ingress of optical or electrical signals.

The processor 1730 is implemented by hardware and software. The processor 1730 may be implemented as one or more CPU chips, cores (e.g., as a multi-core processor), field-programmable gate arrays (FPGAs), application specific integrated circuits (ASICs), and digital signal processors (DSPs). The processor 1730 is in communication with the ingress ports 1710, receiver units 1720, transmitter units 1740, egress ports 1750, and memory 1760. The processor 1730 comprises a path routing module 1770. The path routing module 1770 implements the disclosed embodiments described above. For instance, the path routing module 1770 implements, processes, parses, prepares, or provides the various path routing. The inclusion of the path routing module 1770 therefore provides a substantial improvement to the functionality of the device 1700 and effects a transformation of the device 1700 to a different state. Alternatively, the path routing module 1770 is implemented as instructions stored in the memory 1760 and executed by the processor 1730.

The memory 1760 comprises one or more disks, tape drives, and solid-state drives and may be used as an overflow data storage device, to store programs when such programs are selected for execution, and to store instructions and data that are read during program execution. The memory 1760 may be volatile and/or non-volatile and may be read-only memory (ROM), random-access memory (RAM), ternary content-addressable memory (TCAM), and/or static random-access memory (SRAM).

Figure 18:
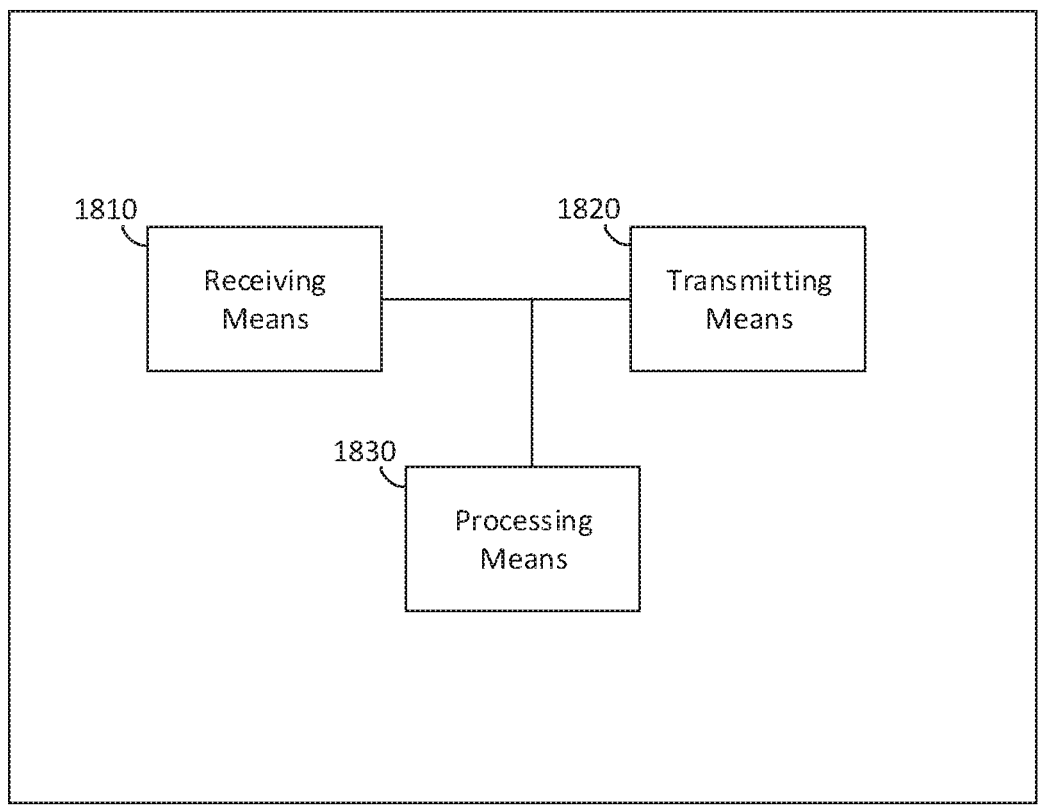
FIG. 18 is a diagram of a means for tunnel ingress protection.

FIG. 18 is a diagram of a means for tunnel ingress protection 1800, for example a network node comprising a BGP controller or an edge node in a network. The means for tunnel ingress protection 1800 includes receiving means 1810, for example receiver units 1720; transmitting means 1820, for example transmitter units 1740; and processing means 1830, for example processor 1730. The receiving means 1810 may be configured to receive a path computation request. The processing means 1830 may be coupled to the receiving means 1810. The processing means 1830 may be configured to calculate a first path from the first ingress node to an egress node; allocate a first list of SIDs to the first path; determine a second ingress node; calculate a second path from the second ingress node to an egress node; and allocate a second list of SIDs to the second path. The transmitting means 1820 may be coupled to the processing means 1830. The transmitting means 1820 may be configured to transmit a first message comprising the first path and the first list of SIDs to the first ingress node; and transmit a second message comprising the second path and the second list of SIDs to the second ingress node.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A border gateway protocol (BGP) controller, comprising:
   a memory; and
   one or more processors coupled to the memory, the one or more processors configured to receive instructions from the memory which, when executed, cause the BGP controller to:
      receive a path computation request;
      calculate a first path from a first ingress node to an egress node;
      calculate a second path from a second ingress node to the egress node;
      transmit a first message using border gateway protocol (BGP), the first message comprising the first path to the first ingress node; and
      transmit a second message using BGP, the second message comprising the second path and an ingress protection indicator to the second ingress node.

2. The BGP controller of claim 1, wherein the second message is a BGP UPDATE message, and wherein the ingress protection indicator comprises a segment routing (SR) ingress protection sub-type-length-value (sub-TLV).

3. The BGP controller of claim 2, wherein the SR ingress protection sub-TLV comprises a primary ingress address sub-sub-TLV indicating an address of the first ingress node.

4. The BGP controller of claim 2, wherein the SR ingress protection sub-TLV comprises a service sub-sub-TLV comprising either a service label of a service carried on the first path or a service identifier of the service.

5. The BGP controller of claim 2, wherein the SR ingress protection sub-TLV comprises a traffic sub-sub-TLV comprising a description of traffic carried on the first path.

6. The BGP controller of claim 1, wherein the second message comprises a flag, the flag instructing the second ingress node to set an entry for the second path in a forwarding information base (FIB) to an active state.

7. The BGP controller of claim 1, wherein the first ingress node and the second ingress node are connected to a traffic source.

8. A method for source routing ingress protection implemented by a border gateway protocol (BGP) controller, the method comprising:
   receiving a path computation request;
   calculating a first path from a first ingress node to an egress node;
   calculating a second path from a second ingress node to the egress node;
   transmitting a first message using BGP, the first message comprising the first path to the first ingress node; and
   transmitting a second message using BGP, the second message comprising the second path and an ingress protection indicator to the second ingress node.

9. The method of claim 8, wherein the second message is a BGP UPDATE message, and wherein the ingress protection indicator comprises a segment routing (SR) ingress protection sub-type-length-value (sub-TLV).

10. The method of claim 9, wherein the SR ingress protection sub-TLV comprises a primary ingress address sub-sub-TLV indicating an address of the first ingress node.

11. The method of claim 9, wherein the SR ingress protection sub-TLV comprises a service sub-sub-TLV comprising either a service label of a service carried on the first path or a service identifier of the service.

12. The method of claim 9, wherein the SR ingress protection sub-TLV comprises a traffic sub-sub-TLV comprising a description of traffic carried on the first path.

13. The method of claim 8, wherein the second message comprises a flag, the flag instructing the second ingress node to set an entry for the second path in a forwarding information base (FIB) to an active state.

14. The method of claim 8, wherein the first ingress node and the second ingress node are connected to a traffic source.

15. A non-transitory computer readable medium comprising instructions that, when executed, cause a border gateway protocol (BGP) controller to:
receive a path computation request;
calculate a first path from a first ingress node to an egress node;
calculate a second path from a second ingress node to the egress node;
transmit a first message using border gateway protocol (BGP), the first message comprising the first path to the first ingress node; and
transmit a second message using BGP, the second message comprising the second path and an ingress protection indicator to the second ingress node.

16. The non-transitory computer readable medium of claim 15, wherein the second message is a BGP UPDATE message, and wherein the ingress protection indicator comprises a segment routing (SR) ingress protection sub-type-length-value (sub-TLV).

17. The non-transitory computer readable medium of claim 16, wherein the SR ingress protection sub-TLV comprises a primary ingress address sub-sub-TLV indicating an address of the first ingress node.

18. The non-transitory computer readable medium of claim 16, wherein the SR ingress protection sub-TLV comprises a service sub-sub-TLV comprising either a service label of a service carried on the first path or a service identifier of the service.

19. The non-transitory computer readable medium of claim 16, wherein the SR ingress protection sub-TLV comprises a traffic sub-sub-TLV comprising a description of traffic carried on the first path.

20. The non-transitory computer readable medium of claim 15, wherein the second message comprises a flag, the flag instructing the second ingress node to set an entry for the second path in a forwarding information base (FIB) to an active state.

* * * * *